Patented May 17, 1927.

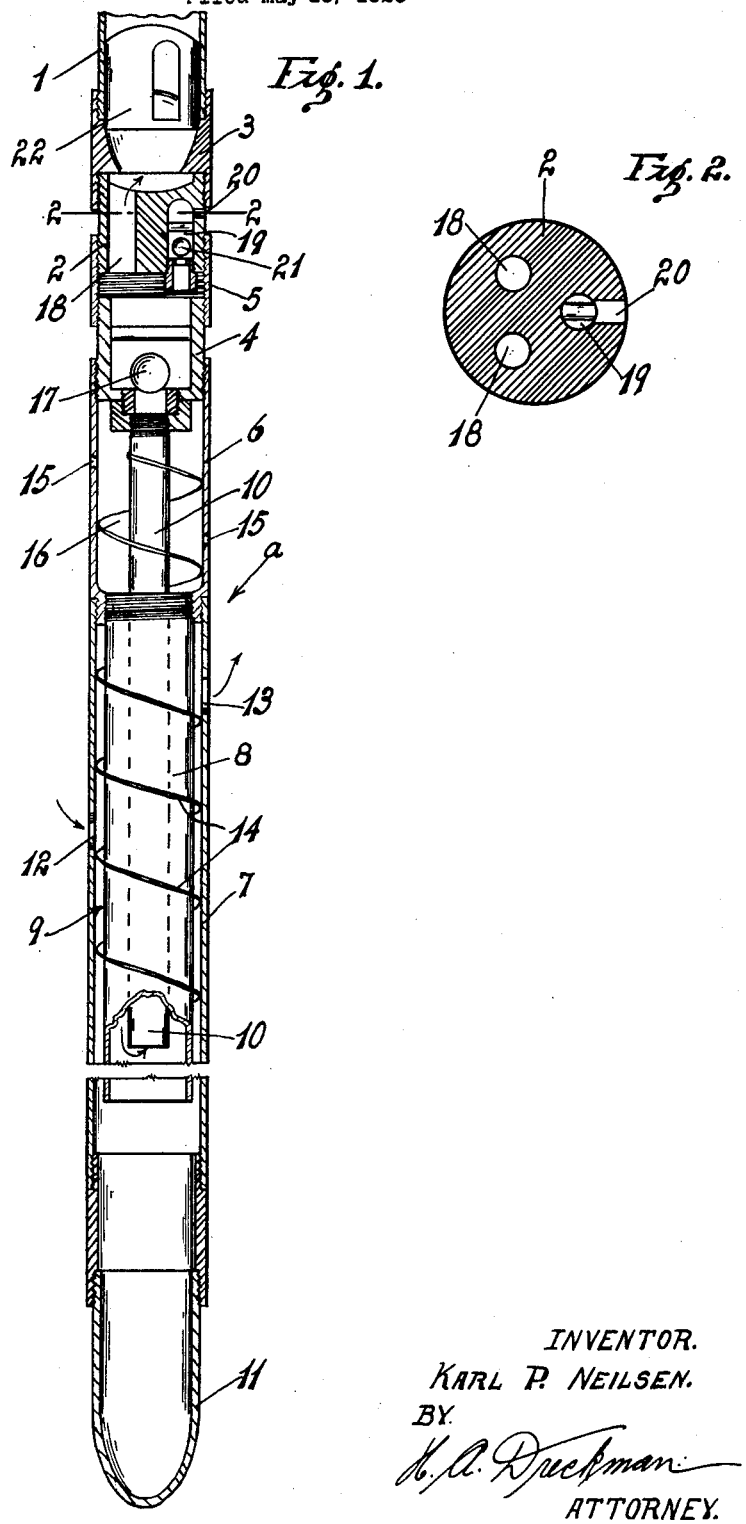

1,628,900

UNITED STATES PATENT OFFICE.

KARL P. NEILSEN, OF LONG BEACH, CALIFORNIA.

DEEP-WELL GAS AND OIL SEPARATOR.

Application filed May 13, 1926. Serial No. 108,767.

An object of my invention is to provide a gas and oil separator, which is positioned in the well and effectively prevents gas from passing and remaining in the oil pump.

Another object is to provide a separator in which there is always a supply of oil ready for the pump.

A further object is to vent each enclosed part of the separator so that gas may escape therefrom.

A still further object is to provide a separator which is an integral part of the oil pump and flow tubing.

Still another object is to provide a separator which is simple in construction and effective in operation.

Other objects, advantages and features of invention may appear from the accompanying drawing, the subjoined detailed description and the appended claims.

In the drawing:

Fig. 1, is a longitudinal sectional view of my separator, the lower portion being broken to shorten the view.

Fig. 2, is an enlarged sectional view on line 2—2 Fig. 1.

Referring more particularly to the drawing: My separator a, depends from and is in alinement with the oil pump, a fragment of which is shown at 1.

A relief valve cage 2, is screwed into the oil pump's standing valve seat 3, and a positive valve cage 4 is secured to the cage 2 by a threaded collar 5.

A breather pipe section 6 screws on to the cage 4 and a body section 7 screws on to the outside of the pipe 6. A separator pipe 8 is threaded into the inside of the pipe 6 and is spaced from the section 7 to form an annular space 9. An intake tube 10 is threaded into the bottom of the cage 4 and extends downwardly into the pipe 8 and is spaced from the walls of said pipe. A hollow plug 11 is mounted on the lower end of a length of pipe secured to the bottom of the section 7 the purpose of which will be further described.

Gas and oil intake ports 12 extend through the body section 7 and open into the space 9, and gas outlet ports 13 are also provided in said section adjacent the upper end thereof. A spiral baffle plate 14 encircles the pipe 8 from above the ports 13 to below the ports 12, and extend across the space 9. Thus the oil and gas entering the ports 12 will traverse the baffle 14, and the gas being lighter will pass upwardly and out of the ports 13, while the oil will fall to the lower end of the section 7 and enter the bottom of the pipe 8. Any sand, dirt etc., will fall to the bottom of the separator in the plug 11 and the pipe section above it, thus a clear passage for the oil into the pipe 8 is maintained at all times, and a separation of the oil and gas is effected due to the baffle 14.

Breather holes 15 are provided in the breather section 6, and a spiral baffle plate 16 is formed on the intake tube in said section, and extends from the tube to the wall of the section.

Reciprocation of the oil pump will cause oil and gas to be drawn through the ports 15 as well as the ports 12, and the spiral 16 will cause a secondary separation of the gas from the oil in the same manner as previously described. The spiral 16 retards the inflow of oil in the same way that the spiral 14 does, and therefor the intake of oil is proportionately divided between the ports 12 and 15. On the up stroke of the pump, oil enters ports 15 and on the down stroke gas is emitted therefrom since oil is displaced in 8.

A positive ball check 17 is positioned in the cage 4 and is adapted to close the upper end of the tube 10. The purpose of this check valve will be further described.

The relief valve cage 2 is provided with passages 18, through which fluid is adapted to pass to the oil pump. A bore 19 extends into the cage 2, and a gas outlet duct 20 extends through the wall of said cage from the said bore. A ball check 21 is adapted to seat in the bottom of the bore 19 and close the opening thereto.

In operation the upward movement of the oil pump plunger will unseat the check 17 and the standing valve 22, and seat the ball check 21. Oil is then drawn through the tube 10 from the inside of the pipe 8, past the ball 17 through the passages 18 and thence to the oil pump. If gas should pass into the tube 10 and pass the check 17, it will pass the ball 21 and flow out of the duct 20. A further object of the ball 21 is to insure seating of the check 17. At the top of the stroke of the plunger the balls 22, 21, and 17 all have a tendency to chatter due to the fact that there is no pressure on the top of them. When this chattering occurs, unseating the ball 21 will break the vacuum above the ball 17 and cause said ball to seat thereby holding the fluid in the tube 10, so that the next stroke of the oil pump will pick up a full charge.

Having described my invention I claim.

1. In a well having a pump a gas and oil separator, comprising an outer shell, a pipe within said shell and spaced therefrom, a tube extending into said pipe and opening into the pump, said shell having fluid intake ports extending therethrough into the space between the pipe and shell, and gas outlet ports also extending from the space, and baffle plates on said pipe extending between the pipe and casing whereby the oil and gas are separated.

2. In a well having a pump, a gas and oil separator, comprising an outer shell, a pipe within said shell and spaced therefrom, a tube extending into said pipe and opening into the pump, said shell having fluid intake ports extending therethrough into the space between the pipe and shell, and gas outlet ports also extending from the space, spiral baffle plates on said pipe extending between the pipe and casing, spiral baffle plates on said tube above said pipe, and said casing having breather holes extending therethrough above the pipe and in the space occupied by the baffles on said tube.

3. In a well having a pump, a gas and oil separator comprising an outer shell, a pipe within said shell and spaced therefrom, said pipe being opened to the shell at the lower end thereof, a tube extending into said pipe and opening into the pump, said shell having a fluid intake extending into the space between the pipe and shell, a space above said pipe and within said shell, and gas outlet ports extending from said last named space above the pipe.

4. In a well having a pump, a gas and oil separator, comprising an outer shell, a pipe within said shell and spaced therefrom, a tube extending into said pipe and opening into the pump, said shell having fluid intake ports extending therethrough into the space between the pipe and shell, and gas outlet ports also extending from the space, spiral baffle plates on said pipe extending between the pipe and casing, spiral baffle plates on said tube above said pipe, and said casing having breather holes extending therethrough above the pipe and in the space occupied by the baffles on said tube, and a check valve in said tube.

5. In a well having a pump, a gas and oil separator, comprising an outer shell, a pipe within said shell and spaced therefrom, said pipe being open to the shell at the lower end thereof, a tube extending into said pipe and opening into the pump, said shell having fluid intake ports extending therethrough into the space between the pipe and shell, and gas outlet ports also extending from the space, spiral baffle plates on said pipe extending between the pipe and casing, spiral baffle plates on said tube above said pipe, and said casing having breather holes extending therethrough above the pipe and in the space occupied by the baffles on said tube, and a check valve in said tube, and relief valve means in said shell above said check valve.

6. In a well having a pump, a gas and oil separator comprising a relief valve cage secured to the pump and having passages therethrough opening to the pump, a relief valve in said cage, a positive valve cage below said relief valve cage, a valve in said positive valve cage, a breather section below said positive valve cage having breather holes therein, a body pipe section depending from said breather section, a hollow plug on said body section, a pipe within said body section and spaced therefrom, baffles on said pipe said body section having fluid inlet and gas outlet ports therein, a tube extending from the positive valve cage and into the pipe said valve in the cage being adapted to close said tube, and baffles on said tube in said breather section.

7. In a well having a pump, a gas and oil separator comprising a relief valve cage secured to the pump and having passages therethrough opening to the pump; a relief valve in said cage, a positive valve cage below said relief valve cage, a valve in said positive valve cage, a breather section below said positive valve cage having breather holes therein, a body pipe section depending from said breather section, a hollow plug on said body a pipe within said body section and spaced therefrom, said body section having fluid inlet and gas outlet ports therein, a tube extending from the positive valve cage and into the pipe, said valve in the cage being adapted to close said tube.

8. In a well having a pump, a gas and oil separator comprising an outer shell, a pipe within said shell and spaced therefrom, a tube extending into said pipe and opening into the pump, said pipe being open to the shell at the bottom thereof, said shell having a space above said pipe and surrounding the tube and having breather holes extending to said space, said shell having fluid intake ports extending therethrough into the space between the pipe and shell, and gas outlet ports also extending from the space.

9. In a well having a pump, a gas and oil separator comprising a relief valve cage secured to the pump and having passages therethrough opening to the pump, a relief in said cage, a breather section below said relief valve cage having breather holes therein, a body pipe section depending from said breather section, a pipe within said body section and spaced therefrom, said body section having fluid inlet and gas outlet ports therein, and a tube extending into said pipe and opening into the relief valve cage.

In testimony whereof I affix my signature.

KARL P. NEILSEN.